(12) United States Patent
Clock

(10) Patent No.: US 8,422,102 B2
(45) Date of Patent: Apr. 16, 2013

(54) PREFERRED HUE SELECTION METHOD FOR OPTIMIZING COLOR IMAGE REPRODUCTION

(75) Inventor: Jared Wayne Takeo Clock, Mountain View, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 23 days.

(21) Appl. No.: 12/894,060

(22) Filed: Sep. 29, 2010

(65) Prior Publication Data

US 2012/0075644 A1   Mar. 29, 2012

(51) Int. Cl.
G03F 3/08   (2006.01)

(52) U.S. Cl.
USPC ............ 358/518; 358/520; 382/167; 345/593

(58) Field of Classification Search .................. 358/518, 358/520, 3.23, 521, 523, 524; 382/167; 345/593
See application file for complete search history.

(56) References Cited

U.S. PATENT DOCUMENTS

| | | | |
|---|---|---|---|
| 6,594,388 B1 | 7/2003 | Gindele et al. | |
| 6,956,581 B2 | 10/2005 | Cui et al. | |
| 7,379,208 B2 | 5/2008 | Henley et al. | |
| 7,397,588 B2 | 7/2008 | Sloan et al. | |
| 2006/0170999 A1* | 8/2006 | Sloan et al. | 358/520 |
| 2008/0043260 A1* | 2/2008 | Ramanath et al. | 358/1.9 |

* cited by examiner

Primary Examiner — King Poon
Assistant Examiner — Jamares Q Washington
(74) Attorney, Agent, or Firm — Chen Yoshimura LLP

(57) ABSTRACT

A method implemented in a color image reproduction system that includes a data processing apparatus having a non-transitory memory for storing a computer software program and a processor for executing the software program, wherein the program includes a program code configured to cause the data processing apparatus to execute a process for optimizing color image reproduction, which process includes the steps of finding preferred hue angles for a memory color, for each preferred hue angle determining a maximum chroma value of its hue slice, selecting two chroma points at a pre-determined percentage of the maximum chroma value, integrating a lightness function of chroma over a range between the two chroma points to calculate an area under a curve of the function, and selecting a preferred hue angle to be used as a gamut mapping target for the memory color based on the result of the area calculation.

18 Claims, 3 Drawing Sheets

PREFERRED HUE SELECTION METHOD FOR OPTIMIZING COLOR IMAGE REPRODUCTION

BACKGROUND OF THE INVENTION

1. Field of the Invention

This invention relates generally to methods and apparatus for color image reproduction, and in particular, it relates to methods and apparatus for preferred hue selection to optimize color image reproduction.

2. Description of Related Art

Color image reproduction is more widely available in modern days, thanks to the advanced development in color printing technologies and equipment. However, it has always been a challenge for a color printing process to accurately and precisely reproduce colors from one device's (such as a color monitor) color space to another device's (such as a color printer) color space.

The term "color space" is often used to describe a range of colors. A color space is usually defined by selected primary colors. For example, to create a three-dimensional (3-D) representation of a color space defined by the colors of red, yellow and blue, the amount of red color may be assigned to the representation's X-axis, the amount of yellow to its Y-axis, and the amount of blue to its Z-axis. The resulting 3-D space provides a unique position for every possible color that can be created by combining those three colors.

Different types of color image devices may have different color spaces. For example, a color scanner may use an RGB color space defined or created by the red (R), green (G) and blue (B) colors, while a color printer may use a CMYK color space defined or created by the three primary colors of pigment cyan (C), magenta (M), yellow (Y), and black (K)).

The term "gamut" is often used to refer to the range of colors that a device, such as a color scanner or printer, can produce. It is often desired to use one type of color image devices having one color space to reproduce color images from another type of color image devices. For example, it is often desired to reproduce a color image generated by a scanner on to a print medium by a color printer. However, it is likely that many colors in the scanner gamut are outside the gamut of the printer. Colors outside the reproduction range of an output device are referred to as "out of gamut" colors which cannot be reproduced exactly. Instead, some "in gamut" color that is within the reproduction range of the printer must be substituted for each "out of gamut" color in order to reproduce the image. This substitution of colors is often performed by gamut mapping algorithms. Examples of gamut mapping algorithms can be found in U.S. Pat. No. 6,956,581 issued to Cui et al., U.S. Pat. No. 7,379,208 issued to Henley et al., and U.S. Pat. No. 7,397,588 issued to Sloan et al. The concepts of "hue" and "chroma" and related concepts of "hue angle" (or "hue slice") are often used in connection with these exemplary gamut mapping algorithms. However, the concept of quantifying aspects of the hue angle (or hue slices) has not been used in these algorithms for evaluation of the output gamut and to determine which hue to use for the preferred color.

Some color mapping algorithms, such as the one disclosed in U.S. Pat. No. 6,594,388 issued to Gindele et al., perform certain modifications to the preferred hue color based on a predetermined set of parameters. Nonetheless such algorithms did not contemplate modifying the preferred hue color based on the size/shape of the output color gamut at specified preferred hues predetermined by the end user.

It has also been known that human memory of certain colors (known as "memory colors", e.g., skin-tone, foliage, etc.) deviates from the actual colors. Memory colors often have different hues and enhanced colorfulness compared with the actual colors, and it has been shown that human eyes often prefer color reproductions that are closer to the memory colors than to the actual colors. Accordingly, for certain specific color rendering intents, such as perceptual rendering or photographic rendering, it is important to accurately and precisely reproduce certain memory colors (e.g., grass green, sky blue, etc.), and it is also necessary to facilitate a highly dynamic lightness range for color reproduction. The purpose of such a range would be to avoid gradation and detail losses as well as tone jumps for specific regions of the gamut.

Therefore, it is desirable to provide a method for selecting a preferred hue that would be able to give the highest amount of lightness differentiation while still creating an acceptable output color to optimize a color image reproduction.

SUMMARY

The present invention is directed to a method of preferred hue selection for certain memory colors (e.g., sky blue and grass green) based on area calculation via scaled chroma values for non-linear or linear lightness curves to optimize color image reproduction.

An object of the present invention is to provide a metric that would gauge the dynamic lightness range for a certain preferred hue angle over a given chroma range and compare the lightness range to that of closely neighboring hue angle over the same chroma range to determine which preferred hue would be able to give the highest amount of lightness differentiation while still creating an acceptable output color to optimize a color image reproduction.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for optimizing color image reproduction, including the steps of (a) finding preferred hue angles for a memory color; (b) for each preferred hue angle, determining a maximum chroma value of its hue slice; (c) selecting two chroma points at a pre-determined percentage of the maximum chroma value; (d) integrating a lightness function of chroma over a range between the two chroma points to calculate an area under a curve of the function; and (e) selecting a preferred hue angle to be used as a gamut mapping target for the memory color based on the result of the area calculation.

In another aspect, the present invention provides a color image reproduction system comprising a data processing apparatus having a non-transitory memory storing a computer software program and a processor executing the software program, wherein the program includes a program code configured to cause the data processing apparatus to execute a process for optimizing color image reproduction, which process includes the steps of (a) finding preferred hue angles for a memory color; (b) for each preferred hue angle, determining a maximum chroma value of its hue slice; (c) selecting two chroma points at a pre-determined percentage of the maximum chroma value; (d) integrating a lightness function of chroma over a range between the two chroma points to calculate an area under a curve of the function; and (e) selecting a preferred hue angle to be used as a gamut mapping target for the memory color based on the result of the area calculation.

In yet another aspect, the present invention provides a color image reproduction optimization computer software program product having a computer readable program code embedded in a computer usable non-transitory storage medium for controlling a data processing apparatus, the computer readable program code configured to cause the data processing apparatus to execute a process for optimizing color image reproduction by one or more color image reproduction devices connected to the data processing apparatus, which process includes the steps of (a) finding preferred hue angles for a memory color; (b) for each preferred hue angle, determining a maximum chroma value of its hue slice; (c) selecting two chroma points at a pre-determined percentage of the maximum chroma value; (d) integrating a lightness function of chroma over a range between the two chroma points to calculate an area under a curve of the function; and (e) selecting a preferred hue angle to be used as a gamut mapping target for the memory color based on the result of the area calculation.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method of optimizing color image reproduction by selecting preferred hue for certain memory colors (e.g., sky blue and grass green) based on area calculation via scaled chroma values for non-linear or linear lightness curves.

As discussed above, for many gamut mapping algorithms, the highest chroma point overall for each primary and secondary color is selected from the output gamut to be used for the mapping "target", so when the input gamut and the output gamut are aligned, the resulting mapped colors should allow for the highest dynamic range for each color. The resulting color, although vivid and saturated, in most cases will not look "natural" and therefore the hue needs to be modified to fit the idea of perceptual or photographic rendering intent. To create this appearance, the mapping target for the destination space should be selected based on the hue angle of the preferred color, for example, green, so that images with green grass in them look very natural. However, it is not always the best idea to select the "perfect" green hue, as for certain chroma levels of green, the image may look correct, but for certain other levels; there may not be enough of a lightness difference to show fine details and shadows, thus creating a poor resulting image. One purpose of the present invention method is to solve this kind of problems where "perfect" color meets "imperfect" gamut shapes.

Figure 2:
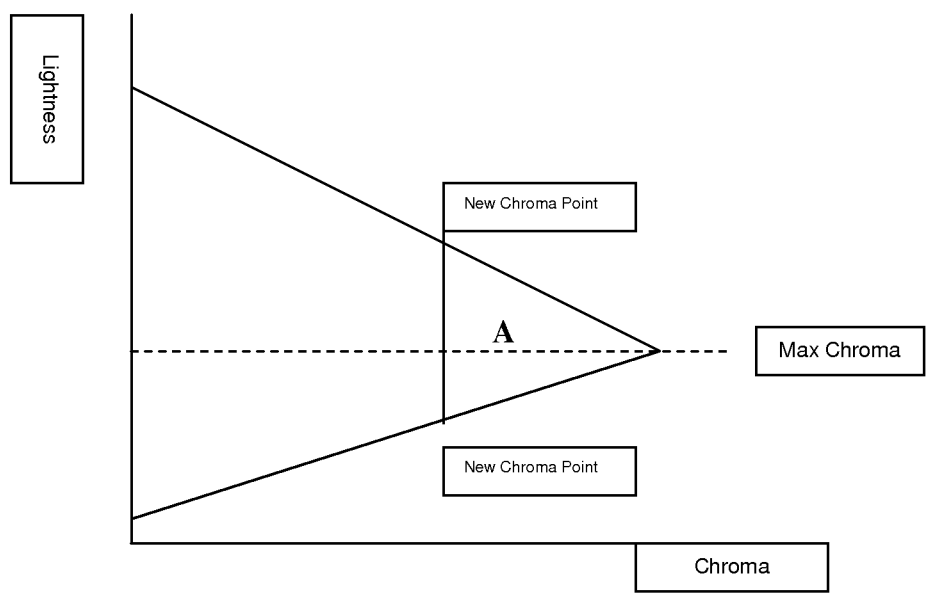
FIG. 2 is a plot diagram illustrating a hue slice area calculation for optimizing color image reproduction, according to an embodiment of the present invention.

Referring to FIG. 2, an exemplary embodiment of the present invention method begins with finding a list of preferred hue angles for several memory colors (e.g., sky blue and grass green) (Step 110). There have been many studies on preferred hues for sky blue and grass green, which may be used in determining the target hues for each of these memory colors. In determining the chroma range to analyze the lightness difference (dL), a metric is needed to determine how to select appropriate values.

For each preferred hue angle, the maximum chroma value is determined for the hue slice shown in FIG. 2 (Step 120). Referring to FIG. 2, there is illustrated the hue slice created for a preferred hue angle, along with the other variables that need to be determined. First, in each direction, towards higher and lower Lightness values, a chroma point is found that is a certain percentage (e.g., X %) of the maximum chroma value. So in this step, two chroma points at a predetermined percentage of the maximum chroma value are selected (Step S130 in FIG. 1).

Figure 1:
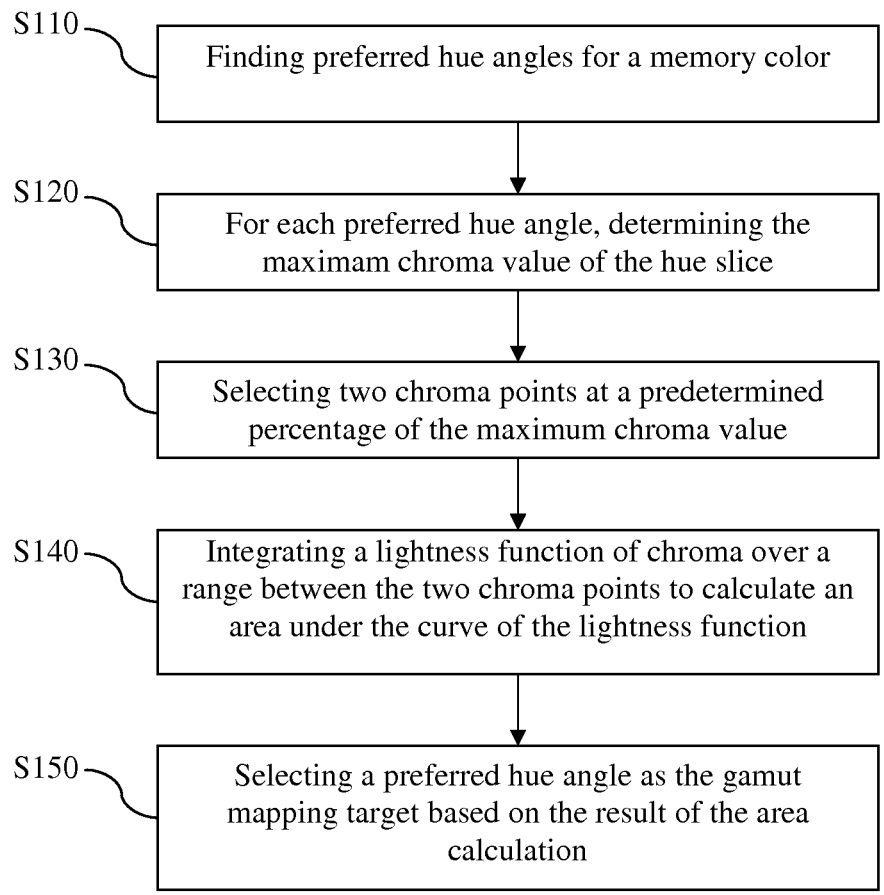
FIG. 1 is a flow chart illustrating an exemplary process for optimizing color image reproduction, according to an embodiment of the present invention.

Referring to FIGS. 1 and 2, the next step (Step 140) is to calculate the area (A) in the range bounded by the two chroma points, under a best-fit curve of the lightness as a function of chroma, which may be determined by a variety of methods.

Setting the pre-determined percentage (X %) for using in the area calculation will be dependent upon the maximum chroma values of the target hues that are to be used for the evaluation. For example, since the preferred color hues for grass green and sky blue should be within a somewhat narrow hue range respectively, the maximum chroma values between the different hue slices are not significantly different, although it depends on the shape of the color gamut. The purpose of setting a pre-determined percentage of the chroma of the hue slice is to use only the most saturated colors in the area analysis and final hue selection.

For example, depending on the value of the maximum chroma for each target hue, the pre-determined percentage may be set as follows:

If the maximum chroma value (for each hue slice) is less than 30: then set the pre-determined percentage (X %) to be 90% of the maximum value to determine the two chroma points (i.e., the upper and lower bounds of the area A)

If the maximum chroma value (for each hue slice) is between 30 and 60: then set the pre-determined percentage (X %) to be 80% of the maximum value to determine the two chroma points If the maximum chroma value (for each hue slice) is greater than 60: then set the pre-determined percentage (X %) to be 70% of the maximum value to determine the two chroma points The above setting means that if the maximum chroma for the hue slices is greater than 60, a greater percentage of the colors in the gamut will be used for the area calculation, as more of the colors are far enough away from the neutral axis to impact the target regions. On the other hand, if the maximum chroma value for the hue slices is less than 30, a much smaller percentage of the colors in the gamut will be used for the area calculation, as less of the colors are far enough away from the neutral axis to impact the target region.

If there is a situation where some of the maximum chroma values are in two different categories for the target hue slices, the maximum chroma values will be averaged and that average value will be used for setting the pre-determined percentage for the area calculation.

For example, the hue angle of the most preferred blue color is 270°, but other preferred blue color hues include 265°, 273°, and 268°. By analyzing the measurement data of the printer for the 270° blue hue, the maximum chroma value is C=50, and the maximum chroma values for the other three target hues are also between 30 and 60. Therefore, the predetermined percentage can be set at 80% of the maximum chroma value for determining the two chroma points that will be used as the boundary points. One chroma point is located at a higher Lightness value and another one chroma point is located at a lower Lightness value, both at C=40, which is 80% of the maximum chroma value.

To determine the area A under the curve that is located above the maximum chroma line, the following integral formula can be used:

$$\int_{40}^{50} f(x)dx \quad (1)$$

Where f(x) designates the function created by the Lightness values in relation to the line of maximum chroma. This function f(x) may be a linear or non-linear function.

As a simple example, f(x)=−x+50, which gives the area of the positive portion of the curve relative to the maximum chroma line. The result of integration is 50.

For the area under the curve that is located below the maximum chroma line, the following integral can be used:

$$-\int_{40}^{50} f(x)dx \quad (2)$$

Using the same simple example, this time f(x)=x−50, which gives the area of the negative portion of the curve relative to the maximum chroma line. The result of the integration is 50. Therefore the total area A under the curve is A=100. This value is stored for later comparison.

The second most preferred blue color has a hue angle of 265°. The same procedure is used as above to determine the area under the curve. This process can be repeated for whatever hue angles that are considered to be preferable for the target memory color. This will yield a collection of areas each corresponding to a preferred hue angle. If it is determined that for one of the preferred hue angles, the area is sizably larger than the area for a more highly preferred hue angle, that hue angle will be selected as the gamut mapping target (Step 150). If there is not a significant difference between the areas for the preferred hue angles, then a most desired hue will be selected as the gamut mapping target.

Through the process described above, for a selected memory color, a preferred hue angle can be chosen as the gamut mapping target based on the comparison of the area calculations of multiple preferred hue angles for the selected memory color.

Figure 3:
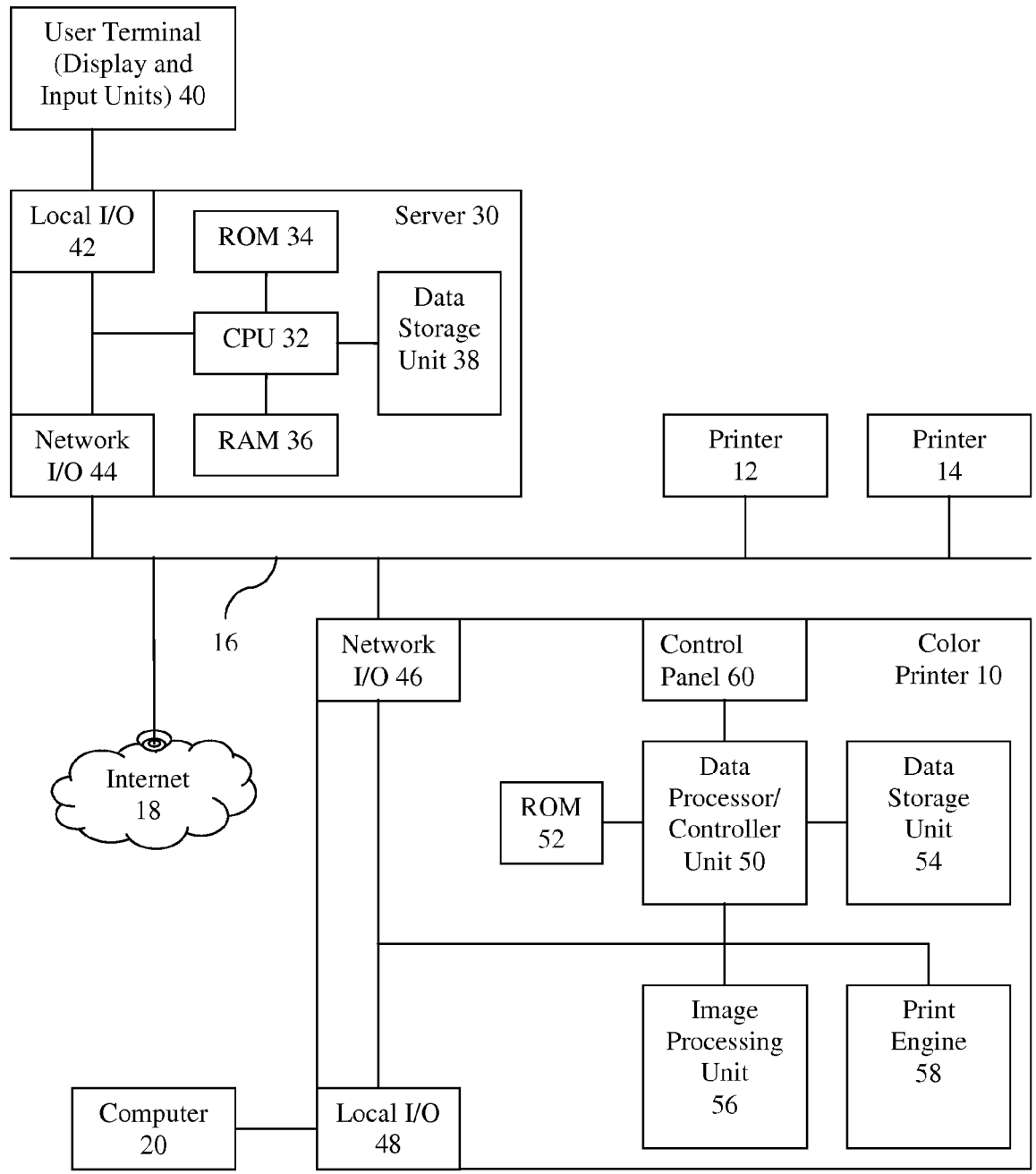
FIG. 3 is a schematic block diagram showing an exemplary color image reproduction system, according to an embodiment of the present invention.

Referring to FIG. 3, there is schematically shown an exemplary color image reproduction system for implementing the present invention. The color image reproduction system include a color printer 10 and other color or black and white printers 12, 14, etc., connected to one or more computers 20 and/or servers 30 (or any suitable data processing apparatus) directly or remotely via a data communication channel 16 which may be a wired or wireless network, a dedicated cable or a serial bus connected to the printers.

One or more user terminals 40 (each may have its display and input units) may be connected to the server 30 to enable operators and/or users to interact with the server 30 and/or the rest of the color image reproduction system. Alternatively the server may have its own integrated display and input units to enable operators and/or users to interact with the server and/or the rest of the color image reproduction system.

The server 30 typically includes a central processor unit (CPU) 32 that controls the function and operation of the server 30 and execute computer instructions and programs that may be installed or saved on a read only memory (ROM) 34, a random access memory (RAM) 36, or a data storage unit 36 (such as a hard disc drive) coupled to the CPU 32. The server typically also has a local input/output (I/O) port 42 for connection with the user terminal 44, and a network I/O port 44 for connection to the data communication channel 16. It is understood that the basic components of the computer 20 are similar to that of the server 30 and therefore will not be repeated in detail here.

The server 30 is preferably also connected to an open external network 18 such as the Internet for remotely receiving on-line print jobs. The server 30 is remotely connected to the printer 10 via a network I/O port 46 of the printer 10, whereas the computer 20 may be directly connected to the printer 10 via a local I/O port 48 of the printer 12.

In a preferred color image reproduction system according to embodiments of the present invention, the server 30 is the under control of a color image reproduction software program, receives in-house or on-line print jobs from users or customers, process or generate print job tickets, and submits print job tickets and the documents or files to be printed (the "source documents" or "source files") to the one or more printers 10, 12, 14, etc.

The basic components of the printers 10, 12 and 14 are also illustrated in color printer 10, which include a data processor or controller unit 50 that controls the function and operation of the printer 10. The controller unit 50 of printer 10 is connected to a ROM (and/or a RAM) 52 and a data storage unit 54. The software program exemplarily implementing the present invention method and process may be installed on the computer 20 or server 30, but may also be installed on ROM (and/or RAM) 52 or data storage unit 54 (of the printer 10) which may include a non-transitory memory medium, and can be accessed and executed by the controller unit 50. The controller unit 50 is also coupled to and controlling an image processing unit 56 and a print engine 58 of the printer 10. A printer control panel 60 is provided on the printer 10. The control panel 60 is accessible by an operator or user and provides a user interface (UI) that may includes a display screen such as a liquid crystal display (LCD) display screen and user input devices such as keys, buttons, touch screen, etc., for an operator or user to communicate with the printer 10 and control the functions and operations of printer 10.

The exemplary color image reproduction system shown in FIG. 2, in which embodiments of the present invention may be implemented, may also include other devices (not shown) connected to the computer 20, server 30 or network 16, such as scanners, etc. As mentioned above, remote users or customers may also be connected to the "on-line" server 30 or printer 10 via the Internet 18. In addition, the print shop system may also include a number of "off-line" (or "off-network") devices (not shown) that are not connected to the network 16, which devices may be any type of devices used in a printing or image reproduction system, such as finishing devices, prepress devices, etc.

The term "printer" used herein may be small desk-top printers typically seen in an office environment, or large printing systems used in print/copy departments at large organizations or professional print shops. It may also cover other similar image reproduction and document processing devices such as copiers or multifunction ("all-in-one") printers that also have copier, scanner and/or facsimile functions. As described above, the printer may be directly attached to a computer or server locally, or connected to a computer or server through a network remotely, where the computer or server are used to generate and send a print job to be processed by the printer through a printer driver which is a computer software program normally installed on the computer or server for converting the document or image to be printed to the form specific to the printer. The printer may have multiple paper trays to store paper of various sizes, color, and types. Further, the printer may be equipped with a sophisticated output sorting mechanism with multiple output trays to perform collate printing or other print finishing functions.

While FIG. 3 shows a color image reproduction system, the present invention is not limited to any physical setting of a system or network, and can be applied to a color image reproduction system having a distributed setting where printers at different locations are connected to a server. In particular, it should be apparent that one or more of the components of the color image reproduction system can communicate with the rest of the system via virtual private network (VPN) or similar means through the Internet.

A color image reproduction optimization software program, including the part for optimizing color image reproduction that exemplarily implementing the present invention method and process, may be installed on the computer 20, the server 30 or the controller unit 50 of the color printer 10. When an operator or user executes the color image reproduction optimization software program, the computer 20 or server 30 carries out various functions of the software, including optimizing color image reproduction that implements the method of the prevent invention. The color image reproduction optimization software also utilizes useful features of a user interface (UI) and/or a graphical user interface (GUI) of the computer 20 or server 30 such as a touch screen and/or a mouse and a keyboard, coupled or combined with a display monitor.

The color image reproduction optimization software program that implements the present invention method may also be stored in the ROM (and/or RAM) 52 or data storage unit 54 of the printer 10 and executed by the controller unit 50 of the printer 10, utilizing the features and functions of the display panel 60 of the printer 10 for providing a UI and/or GUI to the operator or user of the printer 10.

In the context of this application, each of the devices in the color image reproduction system may be generally referred to as a "color image reproduction device" or "color image reproduction apparatus", and each of them performs some aspects of color image reproduction such as job intake, routing, editing, prepress, printing, finishing, etc. Various color image reproduction devices or apparatus are controlled by various color image reproduction programs, which reside in memories and are executed by processors of the color image reproduction devices and apparatus. Each color image reproduction program has a print job database to store print jobs it processes. In this application, the terms "data processing apparatus" broadly refer to any computer, server, controller unit, and/or data processing apparatus that can implement various features of embodiments of the present invention described below with appropriate hardware/software.

The color image reproduction optimization method according to the present invention has many advantages. It provides a metric that would gauge the dynamic lightness range for a certain preferred hue angle over a given chroma range. It also provides an evaluation tool that compares the lightness range of one hue angle to that of closely neighboring hue angles over the same chroma range to determine which preferred hue would be able to give a highest amount of lightness differentiation. It further provides a color image reproduction with the highest amount of lightness differentiation while still creating an acceptable output color to optimize the color image reproduction.

It will be apparent to those skilled in the art that various modification and variations can be made to the methods of the present invention without departing from the spirit or scope of the invention. Thus, it is intended that the present invention cover modifications and variations that come within the scope of the appended claims and their equivalents.

What is claimed is:

1. A method for optimizing color image reproduction, comprising the steps of:
   a. finding preferred hue angles for a memory color;
   b. for each preferred hue angle, determining a maximum chroma value of its hue slice;
   c. selecting two chroma points at a pre-determined percentage of the maximum chroma value;
   d. integrating a lightness function of chroma over a range between the two chroma points to calculate an area within the hue slice under a curve of the function;
   e. selecting a preferred hue angle to be used as a gamut mapping target for the memory color based on the result of the area calculation; and
   f. wherein the pre-determined percentage is dependent on the maximum chroma value and decreases as the maximum chroma value increases.

2. The method of claim 1, wherein if the maximum chroma value is less than 30, then the pre-determined percentage is 90%.

3. The method of claim 1, wherein if the maximum chroma value is between 30 and 60, then the pre-determined percentage is 80%.

4. The method of claim 1, wherein if the maximum chroma value is greater than 60, then the pre-determined percentage is 70%.

5. The method of claim 1, wherein the lightness function of chroma is a non-linear function.

6. The method of claim 1, further comprising the step of repeating steps b, c, and d for each preferred hue angle.

7. A color image reproduction system comprising a data processing apparatus having a non-transitory memory storing a computer software program and a processor executing the software program, wherein the program includes a program code configured to cause the data processing apparatus to execute a process for optimizing color image reproduction, which process comprises the steps of:
   a. finding preferred hue angles for a memory color;
   b. for each preferred hue angle, determining a maximum chroma value of its hue slice;
   c. selecting two chroma points at a pre-determined percentage of the maximum chroma value;
   d. integrating a lightness function of chroma over a range between the two chroma points to calculate an area within the hue slice under a curve of the function;
   e. selecting a preferred hue angle to be used as a gamut mapping target for the memory color based on the result of the area calculation; and
   f. wherein the pre-determined percentage is dependent on the maximum chroma value and decreases as the maximum chroma value increases.

8. The system of claim 7, wherein if the maximum chroma value is less than 30, then the pre-determined percentage is 90%.

9. The system of claim 7, wherein if the maximum chroma value is between 30 and 60, then the pre-determined percentage is 80%.

10. The system of claim 7, wherein if the maximum chroma value is greater than 60, then the pre-determined percentage is 70%.

11. The system of claim 7, wherein the lightness function of chroma is a non-linear function.

12. The system of claim 7, wherein the process further comprises the step of repeating steps b, c, and d for each preferred hue angle.

13. A color image reproduction optimization computer software program product having a computer readable program code embedded in a computer usable non-transitory storage medium for controlling a data processing apparatus, the program code configured to cause the data processing apparatus to execute a process for optimizing color image reproduction, which process comprises the steps of:
   a. finding preferred hue angles for a memory color;
   b. for each preferred hue angle, determining a maximum chroma value of its hue slice;
   c. selecting two chroma points at a pre-determined percentage of the maximum chroma value;
   d. integrating a lightness function of chroma over a range between the two chroma points to calculate an area within the hue slice under a curve of the function;
   e. selecting a preferred hue angle to be used as a gamut mapping target for the memory color based on the result of the area calculation; and
   f. wherein the pre-determined percentage is dependent on the maximum chroma value and decreases as the maximum chroma value increases.

14. The program product of claim 13, wherein if the maximum chroma value is less than 30, then the pre-determined percentage is 90%.

15. The program product of claim 13, wherein if the maximum chroma value is between 30 and 60, then the pre-determined percentage is 80%.

16. The program product of claim 13, wherein if the maximum chroma value is greater than 60, then the pre-determined percentage is 70%.

17. The program product of claim 13, wherein the lightness function of chroma is a non-linear function.

18. The program product of claim 13, wherein the process further comprises the step of repeating steps b, c, and d for each preferred hue angle.

* * * * *